United States Patent
Ryu et al.

(10) Patent No.: US 10,717,253 B2
(45) Date of Patent: Jul. 21, 2020

(54) DISPLAY DEVICE AND METHOD OF MANUFACTURING THE SAME

(71) Applicant: Samsung Display Co., Ltd., Yongin-si, Gyeonggi-do (KR)

(72) Inventors: Jong Gil Ryu, Yongin-si (KR); Eun Jung Oh, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 133 days.

(21) Appl. No.: 15/806,900

(22) Filed: Nov. 8, 2017

(65) Prior Publication Data
US 2018/0147818 A1 May 31, 2018

(30) Foreign Application Priority Data
Nov. 29, 2016 (KR) .................. 10-2016-0160796

(51) Int. Cl.
| B32B 17/06 | (2006.01) |
| B32B 7/12 | (2006.01) |
| B29C 39/10 | (2006.01) |
| B29L 31/34 | (2006.01) |
| B29K 33/04 | (2006.01) |

(52) U.S. Cl.
CPC ............ B32B 17/064 (2013.01); B29C 39/10 (2013.01); B32B 7/12 (2013.01); B29K 2033/04 (2013.01); B29L 2031/3475 (2013.01); B32B 2307/42 (2013.01); B32B 2457/20 (2013.01); Y10T 428/10 (2015.01); Y10T 428/1095 (2015.01)

(58) Field of Classification Search
CPC ..... B32B 17/064; B32B 7/12; B32B 2307/42; B32B 2457/20; B29C 39/10; B29L 2031/3475; Y10T 428/10; Y10T 428/1095
USPC ........ 428/1.1, 1.62; 438/25, 40; 361/679.01, 361/679.02, 679.21
See application file for complete search history.

(56) References Cited

U.S. PATENT DOCUMENTS

| 7,514,280 B2 | 4/2009 | Lee |
| 9,461,267 B2 | 10/2016 | Yi et al. |
| 2016/0062391 A1* | 3/2016 | Choi ................... H04M 1/0266 361/679.03 |

FOREIGN PATENT DOCUMENTS

| KR | 10-0703446 | 4/2007 |
| KR | 10-0838062 | 6/2008 |
| KR | 10-2011-0022381 | 3/2011 |
| KR | 10-2014-0142419 | 12/2014 |
| KR | 10-2016-0069726 | 6/2016 |

OTHER PUBLICATIONS

Structure of Commercial LCD, retrieved from internet. (Year: 2019).*

* cited by examiner

*Primary Examiner* — Ruiyun Zhang
(74) *Attorney, Agent, or Firm* — Lewis Roca Rothgerber Christie LLP

(57) ABSTRACT

Provided herein may be a display device and a method of manufacturing the same. The display device may include a display panel including a first surface, and a second surface opposite the first surface, a first auxiliary layer on the first surface of the display panel, and including at least one layer, a second auxiliary layer on the second surface of the display panel, and including at least one layer, and a side-reinforcing member enclosing cut surfaces of the display panel, the first auxiliary layer, and the second auxiliary layer.

12 Claims, 13 Drawing Sheets

FIG. 1
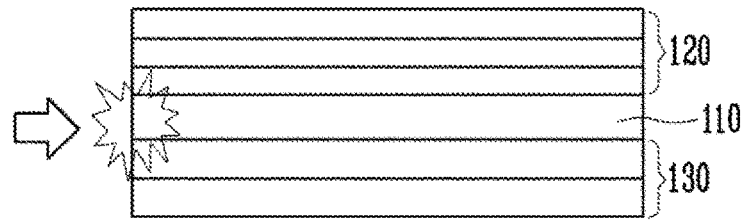
FIG. 2
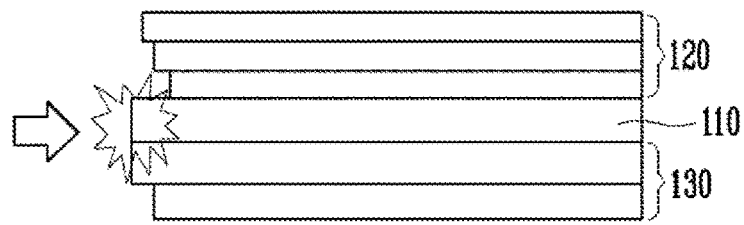
FIG. 3
| ROTATION ANGLE/ IMPULSE (gf*cm) | | NON-INTEGRATED DISPLAY PANEL (FIG. 2) | | INTEGRATED DISPLAY PANEL (FIG. 1) | |
|---|---|---|---|---|---|
| | | CRACK | RELIABILITY | CRACK | RELIABILITY |
| 8° | 59 | NG | NG | OK | OK |
| 10° | 92 | NG | NG | OK | OK |
| 12° | 133 | NG | NG | NG | OK |
| 15° | 205 | NG | NG | NG | NG |
※CRACK: CONFOCAL EXAMINATION / RELIABILITY: WHTS 120hr

DISPLAY DEVICE AND METHOD OF MANUFACTURING THE SAME

CROSS-REFERENCE TO RELATED APPLICATION

This application claims priority to, and the benefit of, Korean patent application no. 10-2016-0160796 filed on Nov. 29, 2016, the entire disclosure of which is incorporated herein in its entirety by reference.

BACKGROUND

1. Field

Various embodiments of the present disclosure relate to a display device, and to a method of manufacturing the display device.

2. Related Art

Generally, in order to supplement the optical properties or mechanical strength of a display device, a film element may be provided on at least one surface of a display panel. For example, a polarizing film, a protective film, or the like may be provided on one surface of a display panel. Such a polarizing film or a protective film may be attached to the display panel via an individual film-attach process.

SUMMARY

Various embodiments of the present disclosure are directed to a display device having improved side strength, and a method of manufacturing the display device.

An embodiment of the present disclosure may provide for a display device. The display device may include a display panel including a first surface, and a second surface opposite the first surface, a first auxiliary layer on the first surface of the display panel, and including at least one layer, a second auxiliary layer on the second surface of the display panel, and including at least one layer, and a side-reinforcing member enclosing cut surfaces of the display panel, the first auxiliary layer, and the second auxiliary layer.

The side-reinforcing member may include an insulator that encloses and clamps the cut surfaces on first sides of the display panel, the first auxiliary layer, and the second auxiliary layer.

The cut surfaces may be tapered, and the side-reinforcing member may have a thickness that gradually changes in accordance with the tapered cut surfaces.

The cut surfaces may have an uneven portion, and the side-reinforcing member may fill a depression of the uneven portion.

The side-reinforcing member may include fine particles having hygroscopicity or water-repellent properties.

The side-reinforcing member may include at least one organic layer and at least one inorganic layer stacked on the cut surfaces.

The display device may further include a bending area at a region of the display panel, wherein at least one of the first auxiliary layer and the second auxiliary layer corresponds to an open area corresponding to the bending area.

The side-reinforcing member may be on both sides of the open area, and may fill at least a portion of the open area.

The side-reinforcing member may have a curved surface.

The first auxiliary layer may include at least one of a polarizing layer, a sensor layer, and a protective layer.

The second auxiliary layer may include at least one of a light-shielding layer, a reflective layer, a thermal conductive layer, and a protective layer.

The side-reinforcing member may include curable resin.

The display panel may include a first area and a second area, wherein at least one of the first auxiliary layer and the second auxiliary layer are in only one of the first area and the second area, and wherein the side-reinforcing member has different widths in the first area and the second area.

An embodiment of the present disclosure may provide for a method of manufacturing a display device. The method may include manufacturing display panels on a mother substrate, separating the display panels through a first cutting process, respectively providing a first auxiliary layer and a second auxiliary layer on a first surface and a second surface of one of the display panels, concurrently processing the display panel, the first auxiliary layer, and the second auxiliary layer through a second cutting process, and forming a side-reinforcing member on cut surfaces of the display panel, the first auxiliary layer, and the second auxiliary layer.

Forming the side-reinforcing member may include forming an insulator that encloses and clamps cut surfaces on at least first sides of the display panel, the first auxiliary layer, and the second auxiliary layer.

Forming the side-reinforcing member may include arranging a frame on the cut surfaces, filling a space between the frame and the cut surfaces with a liquid reinforcing agent, and curing the liquid reinforcing agent.

Forming the side-reinforcing member may include directly applying a reinforcing agent to the cut surfaces, and curing the reinforcing agent.

Forming the side-reinforcing member may include applying or attaching a solid reinforcing agent to the cut surfaces, or laminating the solid reinforcing agent on the cut surfaces.

Forming the side-reinforcing member may include primarily forming a reinforcing member on the cut surfaces, and reprocessing a surface of the reinforcing member.

Forming the side-reinforcing member may include sequentially forming at least one organic layer and at least one inorganic layer on the cut surfaces.

BRIEF DESCRIPTION OF THE DRAWINGS

FIG. 1 is a diagram illustrating a display device according to an embodiment of the present disclosure.

FIG. 2 is a diagram illustrating a display device according to a comparative example.

FIG. 3 is a diagram illustrating results of a Charpy impact test conducted on an integrated display panel illustrated in FIG. 1 and a non-integrated display panel illustrated in FIG. 2.

DETAILED DESCRIPTION

Figure 4:
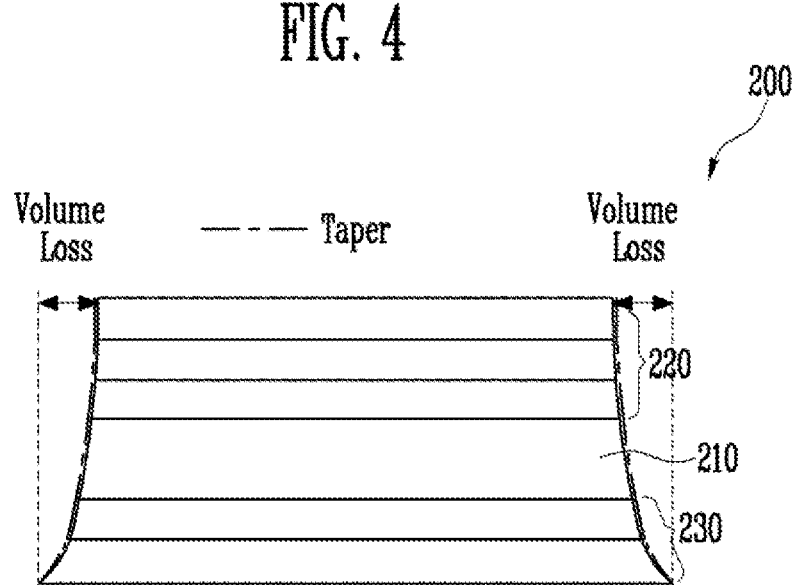
FIG. 4 is a diagram illustrating an example of a cut surface of an integrated display panel provided in a display device according to an embodiment of the present disclosure.

Features of the inventive concept and methods of accomplishing the same may be understood more readily by reference to the following detailed description of embodiments and the accompanying drawings. Hereinafter, embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

In the following description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element, layer, region, or component is referred to as being "on," "connected to," or "coupled to" another element, layer, region, or component, it can be directly on, connected to, or coupled to the other element, layer, region, or component, or one or more intervening elements, layers, regions, or components may be present. However, "directly connected/directly coupled" refers to one component directly connecting or coupling another component without an intermediate component. In addition, it will also be understood that when an element or layer is referred to as being "between" two elements or layers, it can be the only element or layer between the two elements or layers, or one or more intervening elements or layers may also be present.

For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

The terminology used herein is for the purpose of describing particular embodiments only and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the term "exemplary" is intended to refer to an example or illustration.

When a certain embodiment may be implemented differently, a specific process order may be performed differently from the described order. For example, two consecutively described processes may be performed substantially at the same time or performed in an order opposite to the described order.

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Thus, embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

The electronic or electric devices and/or any other relevant devices or components according to embodiments of the present invention described herein may be implemented using any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the embodiments of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a diagram illustrating a display device according to an embodiment of the present disclosure, and FIG. 2 is a diagram illustrating a display device according to a comparative example. In FIGS. 1 and 2, identical or corresponding components are designated by the same reference numerals. Further, FIG. 3 is a diagram illustrating results of a Charpy impact test conducted on an integrated display panel illustrated in FIG. 1, and on a non-integrated display panel illustrated in FIG. 2.

Referring to FIG. 1, the display device according to an embodiment of the present disclosure may include a display panel 110, a first auxiliary layer 120 provided on a first surface (e.g., a top surface) of the display panel 110, and a second auxiliary layer 130 provided on a second surface (e.g., a bottom surface) of the display panel 110. Although an embodiment in which the first and second auxiliary layers 120 and 130, each implemented as a multi-layer structure, are provided on respective surfaces of the display panel 110 is illustrated in FIG. 1 for the convenience of description, the present disclosure is not limited thereto. For example, at least one of the first and second auxiliary layers 120 and 130 may be implemented as a single-layer structure.

In an embodiment, the first auxiliary layer 120 and/or the second auxiliary layer 130 may include at least one of various types of functional layers and protective layers for providing or supplementing specific functions. For example, the first auxiliary layer 120 and/or the second auxiliary layer 130 may include at least one of a polarizing layer, a sensor layer, a protective layer, a ground layer, a reflective layer, a light-shielding layer, a thermal conductive layer, and an adhesive layer.

In accordance with an embodiment, the display panel 110, the first auxiliary layer 120, and the second auxiliary layer 130 may be simultaneously processed. For example, after the first auxiliary layer 120 and the second auxiliary layer 130 have been directly and respectively formed on both surfaces of the display panel 110 through a coating process or the like or, alternatively, the first auxiliary layer 120 and the second auxiliary layer 130 have been respectively provided on both surfaces of the display panel 110 through a film-attach or transcribing process or the like, the display panel 110, the first auxiliary layer 120, and the second auxiliary layer 130 may be concurrently or simultaneously cut using a cutting process that exploits a knife (knife cut), or a cutting process that exploits a laser (laser cut). By means of this process, as illustrated in FIG. 1, the side boundary lines of the display panel 110, the first auxiliary layer 120, and the second auxiliary layer 130 are respectively arranged on a substantially identical line, and thus an integrated display panel having a substantially even side surface may be manufactured. Here, the term "substantially identical" may inclusively mean a degree of similarity or proximity falling within a range in which error attributable to processing conditions or material properties is allowed to some degree, and does not strictly mean a degree of exact sameness. Further, the fact that the side boundary lines of the display panel 110, the first auxiliary layer 120, and the second auxiliary layer 130 are arranged on the substantially identical line may inclusively mean a case where sharp stepped shapes do not occur on the interface between the side surfaces of the display panel 110, the first auxiliary layer 120, and the second auxiliary layer 130, as well as a case where the side boundary lines thereof are completely coincident with each other.

Referring to FIG. 2, a display device according to a comparative example may include a display panel 110, a first auxiliary layer 120 provided on a first surface (e.g., a top surface) of the display panel 110, and a second auxiliary layer 130 provided on a second surface (e.g., a bottom surface) of the display panel 110. In accordance with an embodiment, the first auxiliary layer 120 and/or the second auxiliary layer 130 may include a polarizing film or a protective film.

After at least one of the first auxiliary layer 120 and the second auxiliary layer 130 is manufactured on a film that is separate from that of the display panel 110, it may be attached to the display panel 110 through a lamination process or the like. That is, at least one of the first auxiliary layer 120 and the second auxiliary layer 130 may be provided on one surface of the display panel 110 through an individual film-attach process. Accordingly, a non-integrated display panel, such as a film-attached display panel, may be manufactured.

In such a non-integrated display panel, sharp stepped shapes may occur on the side surfaces thereof. For example, in the non-integrated display panel, a stepped shape may occur on at least one interface between the display panel 110 and the first auxiliary layer 120 or the second auxiliary layer 130 due to size error that may occur during a process for manufacturing a film that includes the first and/or second auxiliary layers 120 and 130 or during a process for manufacturing the display panel 110, and/or due to attachment error (e.g., alignment error) that may occur when the film is attached to the display panel 110.

Such an non-integrated display panel including a stepped shape on at least one side surface thereof exhibits lower durability than the integrated display panel. For example, when an impact having the same force is applied to the integrated display panel of FIG. 1 and the non-integrated display panel of FIG. 2, the non-integrated display panel of FIG. 2 may exhibit relatively low side strength.

For example, when a Charpy impact test is conducted after the integrated display panel and the non-integrated display panel of FIGS. 1 and 2 have been respectively manufactured, the results of the Charpy impact test may be as those illustrated in FIG. 3. In FIGS. 1 and 2, an arrow may indicate a portion to which the impact is applied. Referring to FIG. 3, based on the results of the Charpy impact test, it may be determined that the integrated display panel is robust in resistance to cracks and is highly reliable, when compared to the non-integrated display panel.

Therefore, when an integrated display panel is manufactured and stepped shapes on the side surfaces thereof are reduced or minimized, mechanical strength on at least side surfaces may be reinforced. Accordingly, the durability of the display device may be improved.

Additionally, in accordance with an embodiment, the first and/or second auxiliary layers 120 and 130 may be directly formed on the surface of the display panel 110 in the integrated display panel. In this case, a spatial margin between the display panel 110 and the first and/or second auxiliary layers 120 and 130 may be reduced or minimized, and, for example, a zero margin may be realized. Accordingly, the module thickness of the display device may be reduced.

On the other hand, in the non-integrated display panel, an adhesive or the like may be used to attach the first and second auxiliary layers 120 and 130 to the surfaces of the display panel 110. Due thereto, in the non-integrated display panel, a spatial margin may occur in the direction of thickness, which may increase the module thickness of the display device.

FIG. 4 is a diagram illustrating an example of a cut surface of an integrated display panel provided in a display device according to an embodiment of the present disclosure.

Referring to FIG. 4, the display device according to an embodiment of the present disclosure may be provided with an integrated display panel 200 that includes a display panel 210, a first auxiliary layer 220 composed of at least one layer and provided on a first surface of the display panel 210, and a second auxiliary layer 230 composed of at least one layer and provided on a second surface of the display panel 210.

In an embodiment, the display panel 210 may include a base substrate that is implemented as a hard substrate made of glass or tempered glass, or as a soft substrate such as a flexible thin film, and may also include a plurality of pixels provided on the base substrate. The display panel 210 may further include a hard or soft encapsulation substrate or a thin film encapsulation layer having at least one insulating layer. Further, in accordance with an embodiment, the display panel 210 may be, but is not limited to, a display panel including therein a sensor layer, a polarizing layer, or the like. That is, in accordance with an embodiment, a functional layer, such as a sensor layer or a polarizing layer, may be manufactured to be integrated with the display panel 210 or may be provided on at least one surface of the display panel 210.

In accordance with an embodiment, the first surface and the second surface of the display panel 210 may be main surfaces facing each other. For example, the first surface may be a top surface of the display panel 210, and the second surface may be a bottom surface of the display panel 210. In accordance with an embodiment, the display panel 210 may display an image on at least one of the first and second surfaces. That is, the display panel 210 may be a top emission-type, bottom emission-type, or both/double emission-type display panel.

In an embodiment, the first auxiliary layer 220 may include at least one of one or more functional layers and protective layers for providing or supplementing specific functions. For example, the first auxiliary layer 220 may include at least one of a polarizing layer, a sensor layer (e.g., a touch sensor layer, a pressure sensor layer, a fingerprint sensor layer, and/or an optical sensor layer) and a protective layer (e.g., a shock-absorbing layer including a buffer), and may be implemented as, for example, a multi-layer structure.

In an embodiment, the second auxiliary layer 230 may include at least one of one or more functional layers and protective layers. For example, the second auxiliary layer 230 may include at least one of a light-shielding layer, a reflective layer, a thermal conductive layer (e.g., at least one metal layer such as a copper (Cu) layer), and a protective layer, and may be implemented as, for example, a multi-layer structure.

In an embodiment, the first auxiliary layer 220 and the second auxiliary layer 230 may be directly and respectively formed on the first and second surfaces of the display panel 210, or may be provided on the first and second surfaces of the display panel 210, and may then be processed together with the display panel 210. For example, after the first auxiliary layer 220 and the second auxiliary layer 230 have been formed or arranged on both surfaces of the display panel 210, the display panel 210, the first auxiliary layer 220, and the second auxiliary layer 230 may be processed to be simultaneously cut using a cutting process that exploits a knife or a laser, and thus the integrated display panel 200 may be manufactured.

On the other hand, unlike in a non-integrated display panel, in the integrated display panel 200, sharp stepped shapes may be prevented from occurring between the display panel 210 and the first and/or second auxiliary layers 220 and/or 230, or from occurring between respective ones of multiple layers constituting the first and/or second auxiliary layers 220 and/or 230. However, in an actual manufacturing process for manufacturing the integrated display panel 200, even if the display panel 210, the first auxiliary layer 220, and the second auxiliary layer 230 are simultaneously cut, a taper and volume loss, such as those illustrated in FIG. 4, may occur. For example, as a processing deviation occurs due to differences in characteristics or limitations in a manufacturing process between the display panel 210 and the first and/or second auxiliary layers 220 and/or 230, and/or between multiple layers constituting the first and/or second auxiliary layers 220 and/or 230, a taper and volume loss may occur on the cut surface of the integrated display panel 200. Further, although not illustrated in FIG. 4, fine uneven portions may occur along the cut surface (e.g., processing lines on one or both sides) of the integrated display panel 200 due to a processing deviation or the like, and thus flatness of the cut surface may be further deteriorated. In an embodiment, the cut surface(s) may include, but is not limited to, both side surfaces (left and right side surfaces) of the integrated display panel 200. In an embodiment, the cut surface(s) may include four side surfaces of the integrated display panel 200, corresponding to left, right, top and bottom side surfaces.

Accordingly, the present disclosure provides a display device, which has high side strength compared to a non-integrated structure because the display device is provided with the integrated display panel 200 while also having further improved side strength because a taper and volume loss on a cut surface are compensated for. A detailed description thereof will be made later.

Figure 5:
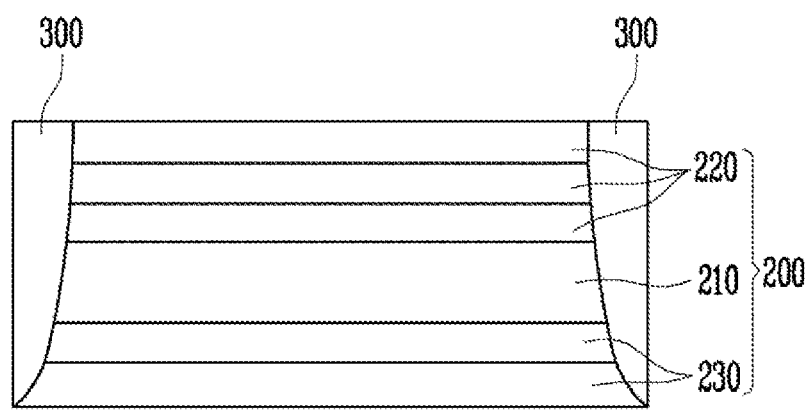
FIG. 5 is a diagram illustrating a display device according to an embodiment of the present disclosure.

FIG. 5 is a diagram illustrating a display device according to an embodiment of the present disclosure. In the embodiment of FIG. 5, the same reference numerals are used to designate components similar to, or identical to, those in the embodiment of FIG. 4, and a repeated detailed description of the components will be omitted.

Referring to FIG. 5, the display device according to an embodiment of the present disclosure may include a side-reinforcing member 300 provided on each side surface of an integrated display panel 200. In an embodiment, the side-reinforcing member 300 may be provided to enclose cut surfaces of at least a display panel 210, a first auxiliary layer 220, and a second auxiliary layer 230. For example, the side-reinforcing member 300 may be implemented as an insulator composed of at least one layer that encloses and clamps (e.g., compresses) all of the cut surfaces on the same side of the display panel 210, the first auxiliary layer 220, and the second auxiliary layer 230.

In an embodiment, the side-reinforcing member 300 may have, but is not limited to, thickness that gradually changes in accordance with the shape of a taper formed on the cut surface so that the taper is compensated for. Further, in an embodiment, the outer surface of the side-reinforcing member 300 may be implemented to be substantially flat so that the outer surface is orthogonal to the first and/or second surface of the display panel 210, but the present disclosure is not limited thereto.

In accordance with the above-described embodiment, a taper and volume loss that may otherwise occur on the cut surface of the integrated display panel 200 may be compensated for by using the side-reinforcing member 300. That is, in accordance with an embodiment of the present disclosure, there is provided a display device that includes the integrated display panel 200 and the side-reinforcing member 300 that is provided on at least one side surface (in particular, each cut surface) of the integrated display panel 200, thus reinforcing side strength of the display device and entirely improving the durability of the display device.

On the other hand, in the present embodiment, a description has been made on the assumption that the side-reinforcing member 300 and the integrated display panel 200 are separate components, but the present disclosure is not limited thereto. For example, it may be considered that the side-reinforcing member 300 is used to configure the integrated display panel 200 together with the display panel 210, the first auxiliary layer 220, and the second auxiliary layer 230.

Figure 6:
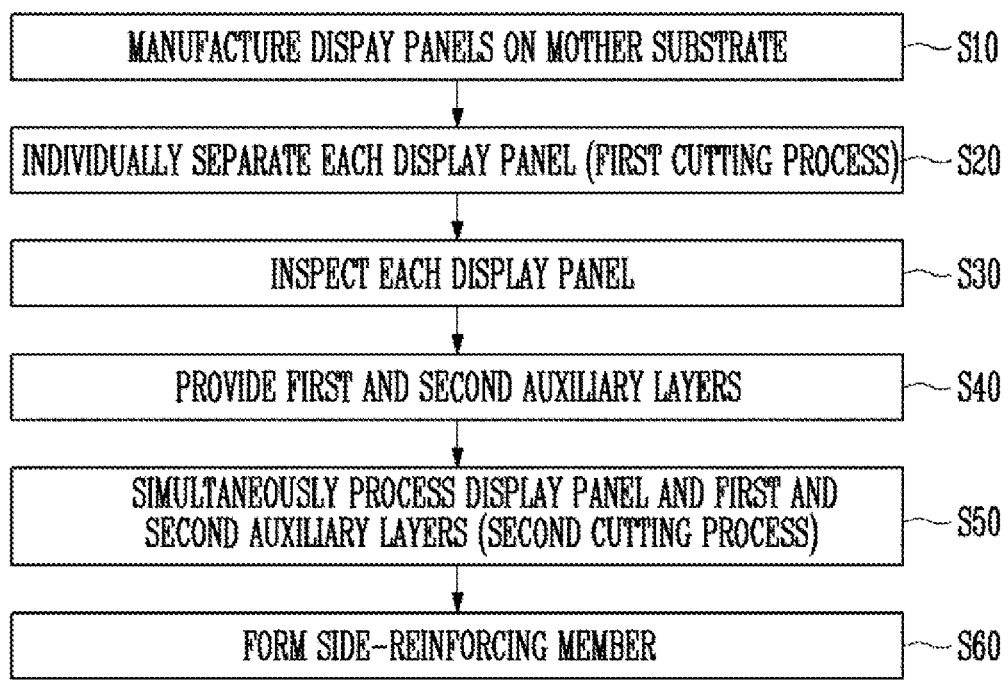
FIG. 6 is a diagram illustrating a method of manufacturing a display device according to an embodiment of the present disclosure.

FIG. 6 is a diagram illustrating a method of manufacturing a display device according to an embodiment of the present disclosure. An embodiment related to the method of manufacturing the display device illustrated in FIG. 5 will be described in FIG. 6.

Referring to FIG. 6, the method of manufacturing the display device according to the present embodiment may include the operation S10 of manufacturing display panels 210 on a mother substrate, the operation S20 of individually separating each display panel 210, the operation S30 of inspecting each display panel 210, the operation S40 of providing first and second auxiliary layers 220 and 230, the operation S50 of concurrently or simultaneously processing the display panel 210 and the first and second auxiliary layers 220 and 230, and the operation S60 of forming a side-reinforcing member 300.

In an embodiment, the operation S10 of manufacturing the display panel 210 on the mother substrate may be configured to concurrently or simultaneously manufacture a plurality of display panels 210 on a single mother substrate. For example, at least one display unit may be formed in each of areas of respective display panels 210 defined on the mother substrate. In an embodiment, the display unit may be configured to include a plurality of pixels in an active area (e.g., a predetermined active area).

In an embodiment, the operation S20 of individually separating each display panel 210 may involve individually separating respective display panels 210 formed on the mother substrate through a first cutting process based on a first cutting line (e.g., a first scribing line). That is, the operation of individually separating each display panel 210 may be a "cell cut" operation.

In an embodiment, the operation S30 of inspecting each display panel 210 may involve conducting a product quality test on each display panel 210. That is, the operation S30 of inspecting each display panel 210 may be a "cell test" operation. For example, the operation S30 of inspecting each display panel 210 may involve performing a lighting test and/or an aging operation on each individual display panel 210.

In an embodiment, the operation S40 of providing the first and second auxiliary layers 220 and 230 may involve providing the first auxiliary layer 220 on the first surface of each display panel 210 while providing the second auxiliary layer 230 on the second surface of the display panel 210. In an embodiment, the first and second auxiliary layers 220 and 230 may be directly formed, attached, or arranged on at least one surface (e.g., the first surface or the second surface) of the display panel 210. In an embodiment, the first auxiliary layer 220 and the second auxiliary layer 230 may be provided or formed either sequentially or concurrently. For example, respective functional layers included in the first auxiliary layer 220 and the second auxiliary layer 230 may be formed through different processing operations or, alternatively, at least one functional layer constituting the first auxiliary layer 220 and at least one functional layer constituting the second auxiliary layer 230 may be concurrently or simultaneously formed.

In an embodiment, the operation S50 of concurrently or simultaneously processing the display panel 210 and the first and second auxiliary layers 220 and 230 may involve manufacturing an integrated display panel 200 by concurrently or simultaneously cutting the display panel 210 and the first and second auxiliary layers 220 and 230 through a second cutting process based on a second cutting line (e.g., a second scribing line or a grinding line). In accordance with an embodiment, the second cutting process may be, but is not limited to, a laser cutting operation that uses a laser.

In accordance with an embodiment, the operation S60 of forming the side-reinforcing member 300 may involve forming the side-reinforcing member 300 on the cut surface of the integrated display panel 200, that is, on the cut surfaces of the display panel 210 and the first and second auxiliary layers 220 and 230. For example, the operation S60 of forming the side-reinforcing member 300 may include the operation of forming an insulator composed of at least one layer, which encloses and clamps all corresponding cut surfaces on at least first sides of the display panel 210 and the first and second auxiliary layers 220 and 230.

In an embodiment, the operation S60 of forming the side-reinforcing member 300 may be performed immediately after the second cutting process. By means of this operation, the delamination of some components constituting the integrated display panel 200, or the permeation of moisture into the integrated display panel 200, may be effectively reduced or prevented in a subsequent process.

In an embodiment, the side-reinforcing member 300 may be implemented as, but is not limited to, an organic reinforcing agent such as resin having viscosity. That is, the side-reinforcing member 300 may be implemented as various types of reinforcing agents that may be used to reinforce strength, in addition to resin. In an embodiment, the side-reinforcing member 300 may be formed by using a scheme for applying or injecting a liquid or solid reinforcing agent to, or into, the cut surface of the integrated display panel 200, or by laminating the solid reinforcing agent on the cut surface.

In an embodiment, after the side-reinforcing member 300 has been formed, an additional module process may be performed. For example, after the side-reinforcing member 300 has been formed, at least one of the operation of mounting a driver IC for driving the display panel 210 and/or inspecting the driver IC, the operation of forming an adhesive layer, the operation of attaching a sensor layer and/or a window, the operation of bending a pad unit of the display panel 210, and the operation of inspecting a final module, may be performed.

Figure 7A:
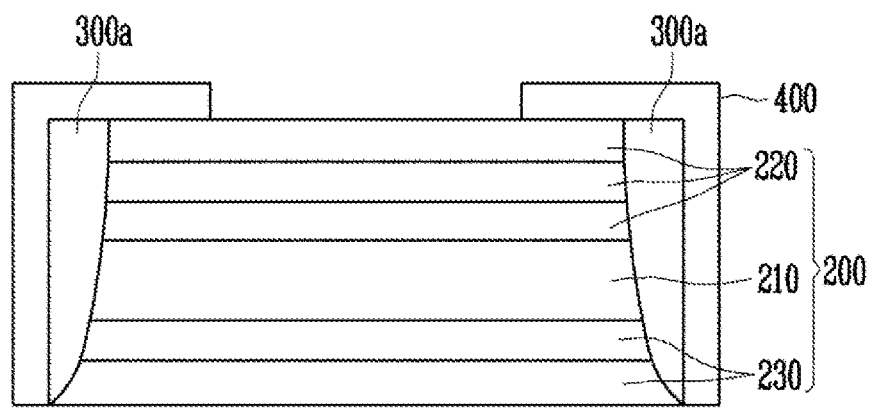
FIGS. 7A and 7B are diagrams illustrating a method of forming a side-reinforcing member according to an embodiment of the present disclosure.
Figure 7B:
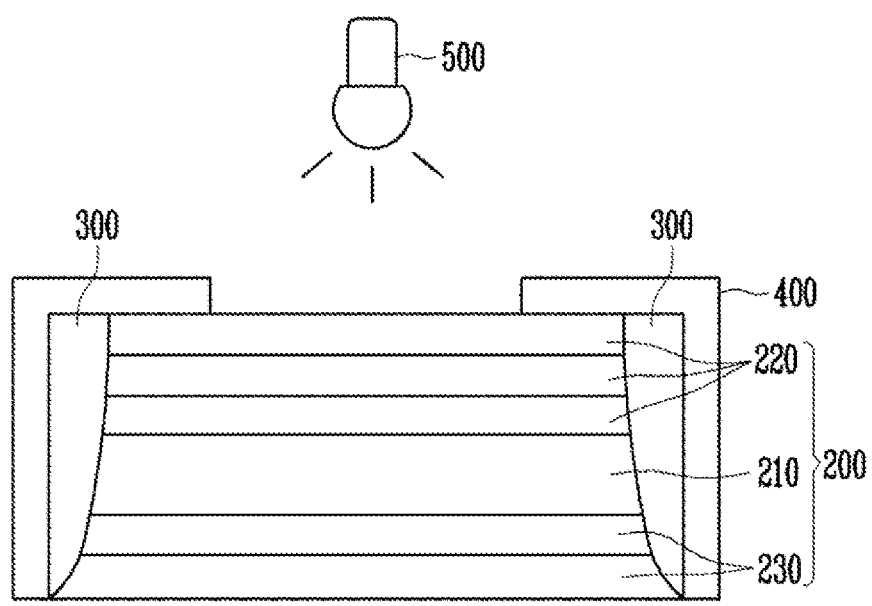
Figure 8A:
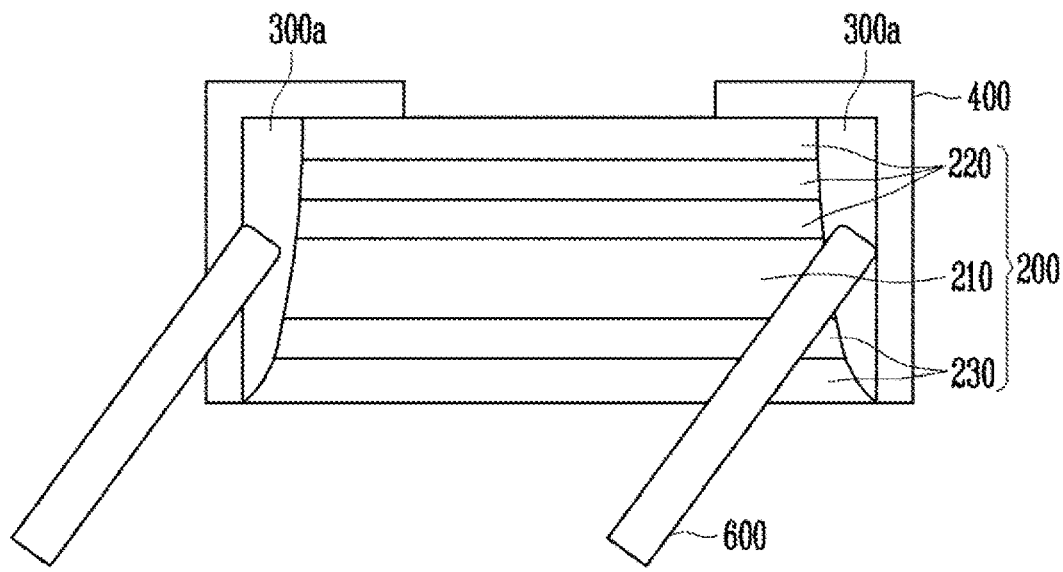
FIGS. 8A and 8B are diagrams illustrating an embodiment of a method of filling the side surface of an integrated display panel illustrated in FIGS. 7A and 7B with a liquid reinforcing agent.
Figure 8B:
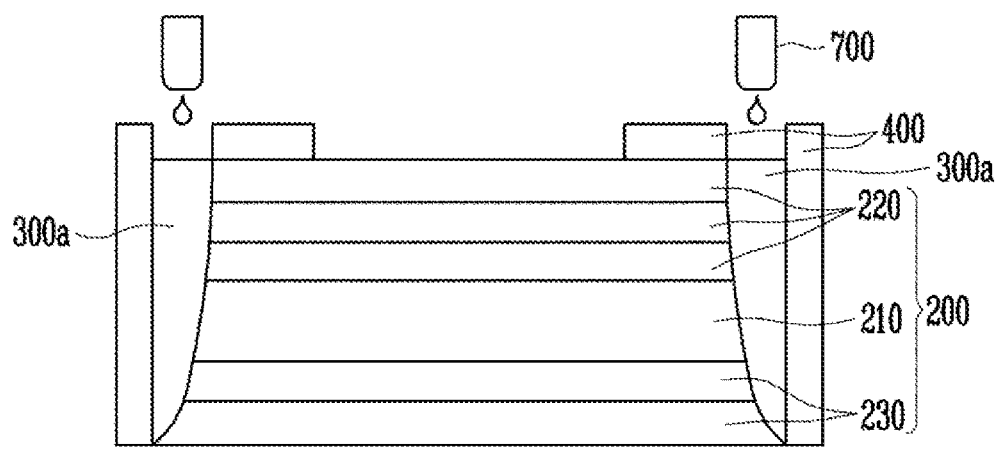
Figure 9:
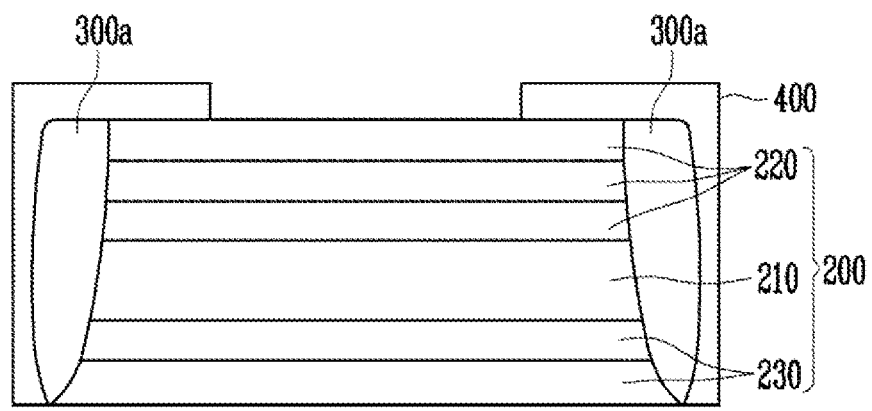
FIG. 9 is a diagram illustrating a method of forming a side-reinforcing member according to an embodiment of the present disclosure.
Figure 10:
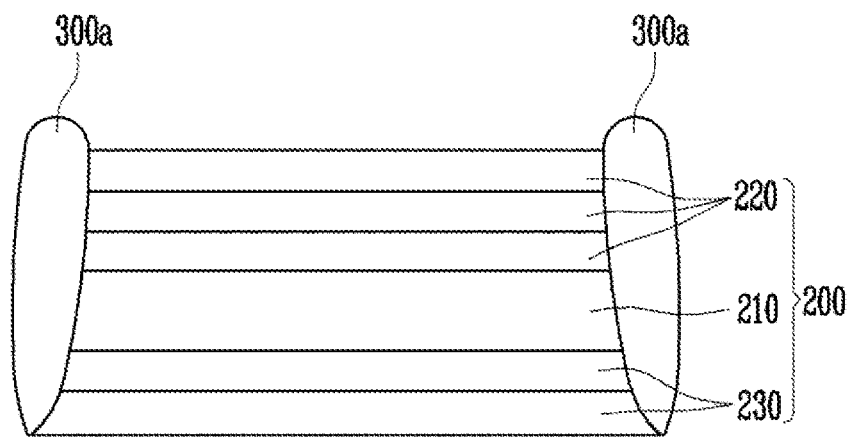
FIG. 10 is a diagram illustrating a method of forming a side-reinforcing member according to an embodiment of the present disclosure.

FIGS. 7A and 7B are diagrams illustrating a method of forming a side-reinforcing member according to an embodiment of the present disclosure. Further, FIGS. 8A and 8B are diagrams illustrating an embodiment of a method of filling a side surface of the integrated display panel illustrated in FIGS. 7A and 7B with a liquid reinforcing agent. Furthermore, FIGS. 9 and 10 are diagrams illustrating a method of forming a side-reinforcing member according to an embodiment of the present disclosure, and illustrate modifications of the embodiment illustrated in FIG. 7A.

Referring to FIGS. 7A and 7B, the method of forming the side-reinforcing member 300 according to an embodiment of the present disclosure may include the operation of forming the side-reinforcing member 300 on the side surface of the integrated display panel 200 by providing a liquid reinforcing agent 300a to the side surface of the integrated display panel 200 using a frame 400, and by curing the liquid reinforcing agent 300a. In accordance with an embodiment, the liquid reinforcing agent 300a may contain, but is not limited to, an organic reinforcing agent made of a thermosetting, photocurable and/or naturally curable insulating material, for example, curable resin. In an embodiment, the liquid reinforcing agent 300a may be made of a viscous material so that a taper formed on the cut surface of the integrated display panel 200 may be effectively compensated for. That is, in order to compensate for an amorphous shape on the cut surface, a viscous liquid reinforcing agent 300a is used, and the shape of the side-reinforcing member 300 may be controlled using the frame 400.

In accordance with an embodiment, the operation of providing the liquid reinforcing agent 300a to the side surface of the integrated display panel 200 may include the operation of arranging the frame 400 on, or in proximity to, the cut surfaces of the display panel 210 and the first and second auxiliary layers 220 and 230, and filling a space between the frame 400 and the cut surfaces with the liquid reinforcing agent 300a. In an embodiment, the liquid reinforcing agent 300a may be filled using injection, application, or the like.

For example, as illustrated in FIG. 8A, the frame 400 may be arranged to enclose the side surface(s) of the integrated display panel 200, for example, to enclose at least an area in which volume loss has occurred. Further, the liquid reinforcing agent 300a may be injected into the space between the frame 400 and the side surface (e.g., the cut surface) of the integrated display panel 200 using, for example, injection equipment equipped with a needle 600. That is, when a closed-top cap-shaped frame 400 is used, the liquid reinforcing agent 300a may be provided to the space between the frame 400 and the integrated display panel 200 using an injection scheme.

Alternatively, as illustrated in FIG. 8B, a top-open frame 400 may be arranged on the side surface(s) of the integrated display panel 200. Further, the liquid reinforcing agent 300a may be applied to the space between the frame 400 and the cut surface of the integrated display panel 200 using, for example, application equipment equipped with a nozzle 700. That is, when a top-open frame 400, like a mask, is used, the liquid reinforcing agent 300a may be provided to the space between the frame 400 and the integrated display panel 200 using an application scheme that uses the nozzle 700, or the like.

In accordance with an embodiment, the shape of the frame 400 may be changed and implemented in various forms depending on the desired shape of the side-reinforcing member 300. For example, when it is desired to form the side-reinforcing member 300 so that it has a substantially flat surface, the frame 400 may have a vertical inner wall, such as that illustrated in FIGS. 7A to 8B.

In other embodiments, when it is desired to form the side-reinforcing member 300 so that it has a convex curved surface, the frame 400 may have a curved inner wall corresponding to the desired shape of the side-reinforcing member 300, as illustrated in FIG. 9. That is, in an embodiment, the surface of the side-reinforcing member 300 may be a curved surface. In this way, the shape of the side-reinforcing member 300 may be variously changed to a planar or curved surface by variously changing the shape of the frame 400 (e.g., an interior of the frame).

On the other hand, when a reinforcing agent 300a having applicable properties is used without requiring the frame 400, the reinforcing agent 300a may be directly applied to the cut surface of the integrated display panel 200 without utilizing the frame 400, as illustrated in FIG. 10. For example, an organic reinforcing agent 300a that is made of curable and highly viscous resin may be directly applied to the cut surface of the integrated display panel 200.

After the reinforcing agent 300a has been arranged on the side surface(s) (e.g., at least the cut surface(s) of the integrated display panel 200) using a scheme such as injection or application, the reinforcing agent 300a may be cured, as illustrated in FIG. 7B. For example, the liquid reinforcing agent 300a may be cured by applying heat and/or light to the liquid reinforcing agent 300a using a lamp 500 or the like. Accordingly, a solid side-reinforcing member 300, which is maintained in a shape for compensating a taper or the like on the cut surface, may be formed while the liquid reinforcing agent 300a is changing to a solid state. The frame 400 may be removed after the curing process has been completed.

Figure 11:
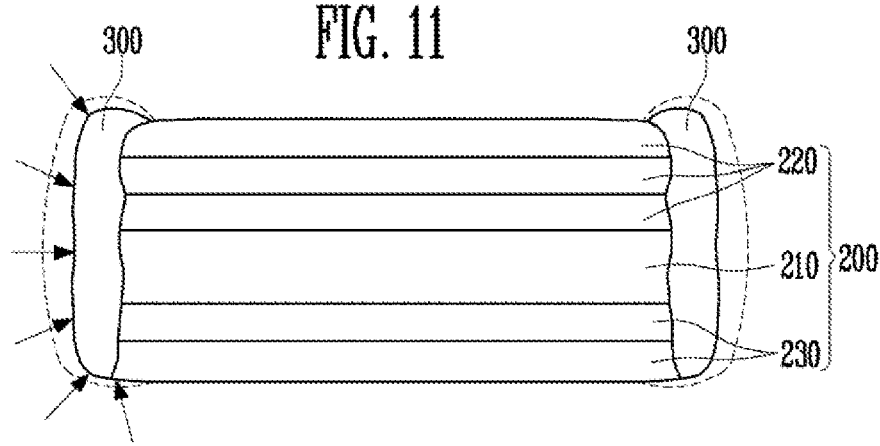
FIG. 11 is a diagram illustrating the clamping effect of a side-reinforcing member according to an embodiment of the present disclosure.

FIG. 11 is a diagram illustrating the clamping effect of a side-reinforcing member according to an embodiment of the present disclosure. In an embodiment, FIG. 11 illustrates a side-reinforcing member manufactured through a curing process.

Referring to FIG. 11, the side-reinforcing member 300 formed through the curing process, such as that described above with reference to FIGS. 7A to 10, may be contracted while being cured. Therefore, the side-reinforcing member 300 may simultaneously clamp all of the components of each of layers constituting the integrated display panel 200 (e.g., components arranged on the display panel 210, the first and second auxiliary layers 220 and 230, and/or on each of internal layers of the display panel 210 and the first and second auxiliary layers 220 and 230). For example, when the side-reinforcing member 300 is made of acrylic resin, the liquid reinforcing agent 300a is contracted at a contraction rate of about 0.2 to 0.8% during a curing process, and thus the solid side-reinforcing member 300 may be formed.

In this way, by the side-reinforcing member 300 on which curing and contraction have occurred, all of the components arranged in each layer on each cut surface of the integrated display panel 200 may be simultaneously clamped (e.g., in directions indicated by arrows shown in FIG. 11). Accordingly, in the second cutting process described above by way of example, even if adhesive strength is deteriorated on an interface between respective layers according to a difference between degrees of processing of the components arranged in each layer, because the side-reinforcing member 300 is formed immediately after the second cutting process, the deterioration of adhesive strength is compensated. Furthermore, owing to the side-reinforcing member 300, damage that may otherwise occur on the cut surface of the integrated display panel 200 due to differences between the degrees of processing of the components arranged in each layer of the integrated display panel 200, or also fine uneven portions attributable to the damage, may be compensated. For example, because the side-reinforcing member 300 fills depressions of the uneven portions occurring on the cut surface, the amorphous shape of the cut surface may be compensated for.

Figure 12A:
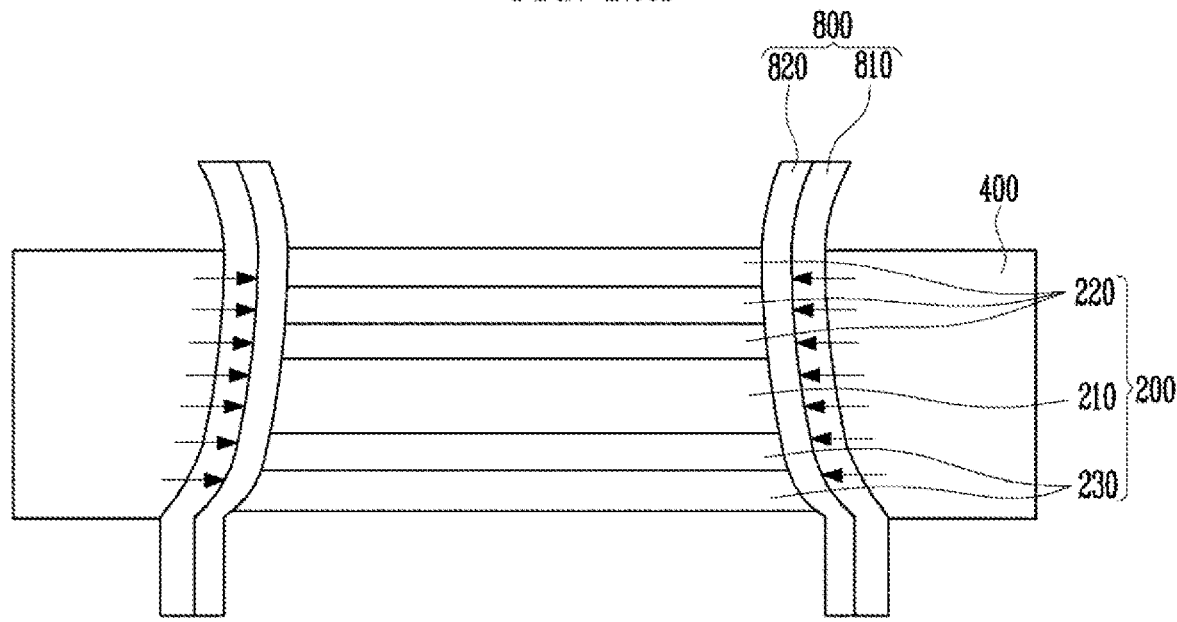
FIGS. 12A and 12B are diagrams illustrating a method of forming a side-reinforcing member according to an embodiment of the present disclosure.
Figure 12B:
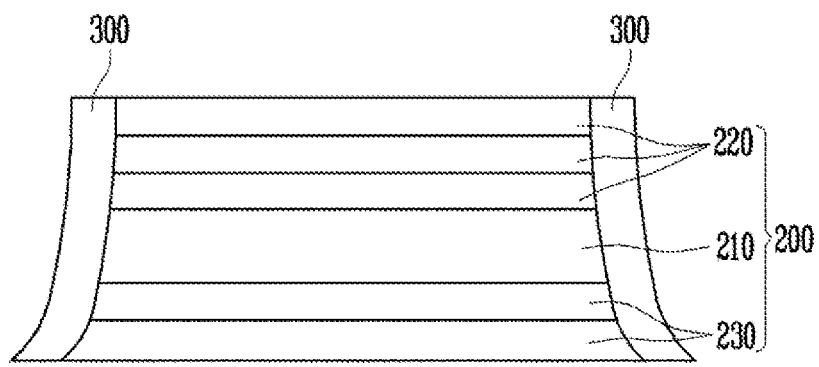

FIGS. 12A and 12B are diagrams illustrating a method of forming a side-reinforcing member according to an embodiment of the present disclosure. In the embodiments of FIGS. 12A and 12B, the same reference numerals are used to designate components similar to, or identical to, those in the above-described embodiments, and a repeated detailed description of the components will be omitted.

Referring to FIGS. 12A and 12B, a side-reinforcing member 300 may be formed on a cut surface(s) of an integrated display panel 200 using a lamination film 800 containing a solid reinforcing agent 820. In an embodiment, the lamination film 800 may contain a base film 810 and the solid reinforcing agent 820 provided (e.g., coated) on one surface of the base film 810. In accordance with an embodiment, the base film 810 may be a heat-transfer film, and the solid reinforcing agent 820 may be a resin layer applied to one surface of the base film 810. In other embodiments, the sold reinforcing agent 820 may be a taper-shaped reinforcing agent that may be self-laminated, as in the case of soldering. That is, the side-reinforcing member 300 may be formed on the side surface (e.g., the cut surface(s)) of the integrated display panel 200 by directly applying, attaching or laminating the solid reinforcing agent 820 to, or on, the cut surfaces of the display panel 210 and the first and second auxiliary layers 220 and 230.

In detail, in an embodiment, as illustrated in FIG. 12A, the lamination film 800 may be arranged between the frame 400 and the cut surface(s) of the integrated display panel 200, and heat and/or pressure may be applied in a direction of arrows. By means of this configuration, as illustrated in FIG. 12B, the side-reinforcing member 300 may be formed by selectively laminating the solid reinforcing agent 820 on a desired area, for example, on the cut surface of the integrated display panel 200.

Meanwhile, as illustrated in FIG. 12B, a taper formed on the cut surface of the integrated display panel 200 might not be completely compensated for, in accordance with an embodiment. For example, the side-reinforcing member 300 may have a curved surface in which at least one certain region is depressed. However, even in this case, an effect of intensifying a coupling force between components arranged in each layer of the integrated display panel 200, and an effect of enhancing the side strength of the integrated display panel 200, may be provided by the side-reinforcing member 300.

Figure 13A:
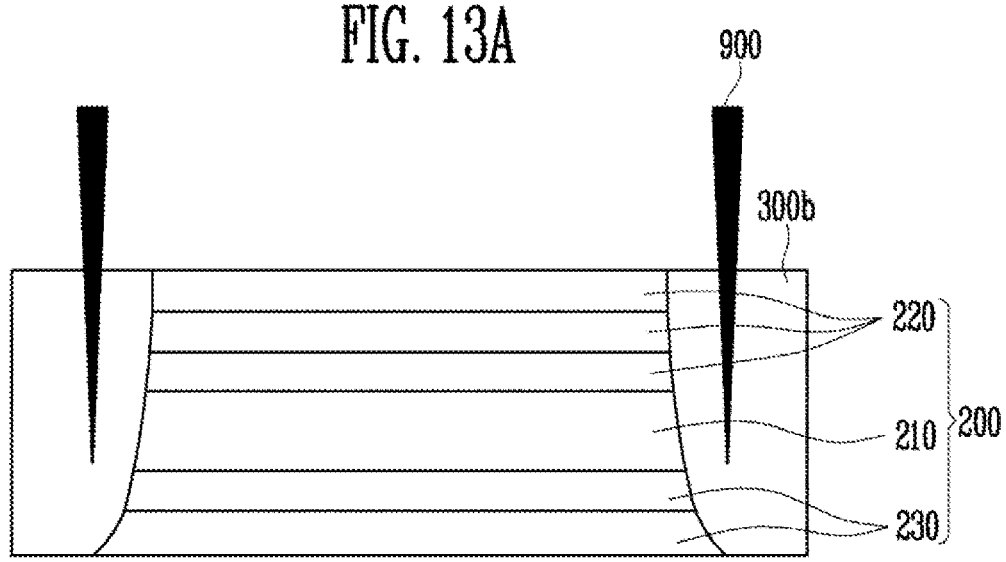
FIGS. 13A and 13B are diagrams illustrating a method of forming a side-reinforcing member according to an embodiment of the present disclosure.
Figure 13B:
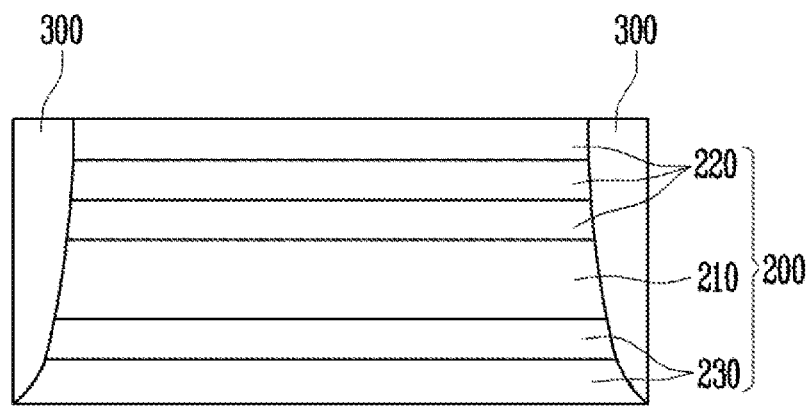

FIGS. 13A and 13B are diagrams illustrating a method of forming a side-reinforcing member according to an embodiment of the present disclosure. In the embodiments of FIGS. 13A and 13B, the same reference numerals are used to designate components that are similar to, or identical to, those in the above-described embodiments, and a repeated detailed description of the components will be omitted.

Referring to FIGS. 13A and 13B, after a reinforcing member 300b is primarily formed on a cut surface(s) of an integrated display panel 200, that is, on cut surfaces of a display panel 210 and of first and second auxiliary layers 220 and 230, the surface of the reinforcing member 300b is then reprocessed, and then a side-reinforcing member 300 having a desired shape and/or size may be formed.

For example, as illustrated in FIG. 13A, a reinforcing member 300b having a sufficient thickness (e.g., a thickness that is equal to or greater than a preset thickness) may be formed on the cut surface of the integrated display panel 200. Thereafter, part of the reinforcing member 300b is eliminated through an additional cutting process that uses a laser or knife 900, or through a polishing process, and thus the side-reinforcing member 300 having the shape and/or thickness, such as that illustrated in FIG. 13B, may be formed.

That is, in accordance with an embodiment, the side-reinforcing member 300 may be delicately formed using a scheme for widening the cut surface of the integrated display panel 200, and for reprocessing the cut surface using a knife or the like, which causes low volume loss. For example, when it is difficult to form a side-reinforcing member 300 having a desired shape and/or size on the cut surface of the integrated display panel 200 due to constraints or limitations in a manufacturing process that occur during the formation of the side-reinforcing member 300, the constraints or limitations in the manufacturing process may be overcome through a reprocessing scheme such as that illustrated in FIGS. 13A and 13B. Accordingly, the side-reinforcing member 300 may be delicately formed to meet a design condition.

Figure 14:
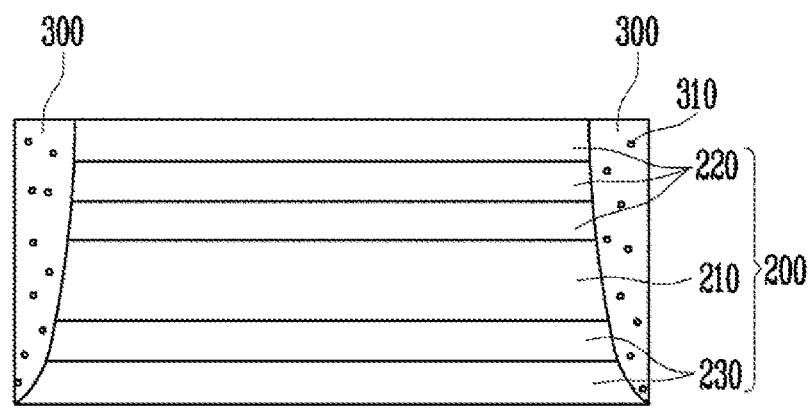
FIG. 14 is a diagram illustrating a display device according to an embodiment of the present disclosure.

FIG. 14 is a diagram illustrating a display device according to an embodiment of the present disclosure. In the embodiment of FIG. 14, the same reference numerals are used to designate components similar to, or identical to, those in the above-described embodiments, and a repeated detailed description of the components will be omitted.

Referring to FIG. 14, in accordance with an embodiment, fine particles 310 for preventing moisture from permeating through a cut surface of an integrated display panel 200 may be distributed inside a side-reinforcing member 300. For example, the side-reinforcing member 300 may contain fine particles 310 having hygroscopicity, or may contain water-repellent fine particles 310 for decreasing water-absorption power when the fine particles 310 are mixed with resin or the like for forming the side-reinforcing member 300. For example, the side-reinforcing member 300 may contain silica nanoparticles. In accordance with this embodiment, moisture that flow from the side surface of the integrated display panel 200 into the integrated display panel 200 may be effectively blocked.

Meanwhile, in addition to the prevention of moisture permeation, various functions may be added to the side-reinforcing member 300 as may be suitable. For example, additional functions may be assigned to the side-reinforcing member 300, in addition to the function of intensifying mechanical strength due to the side-reinforcing member 300, by selecting a material for forming the side-reinforcing member 300 depending on a suitable function.

Figure 15:
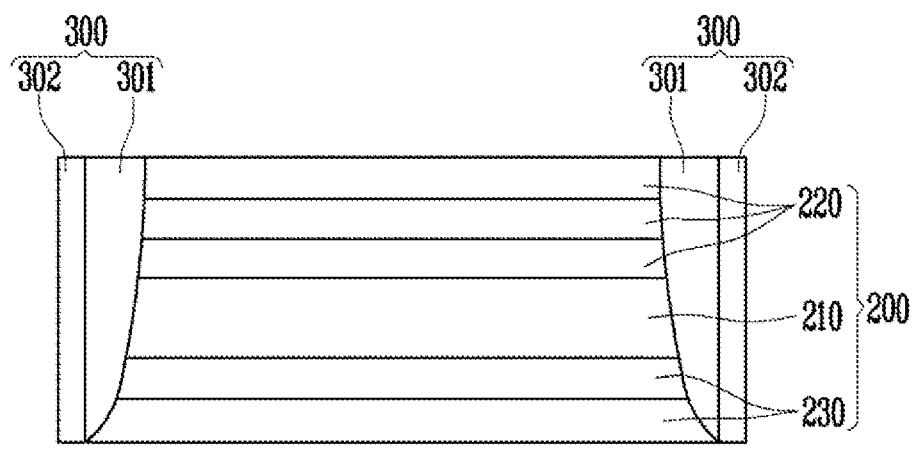
FIG. 15 is a diagram illustrating a display device according to an embodiment of the present disclosure.

FIG. 15 is a diagram illustrating a display device according to an embodiment of the present disclosure. In the embodiment of FIG. 15, the same reference numerals are used to designate components similar to, or identical to, those in the above-described embodiments, and a repeated detailed description of the components will be omitted.

Referring to FIG. 15, a side-reinforcing member 300 may be composed of multiple layers having different physical properties in accordance with an embodiment. For example, the side-reinforcing member 300 may include at least one organic layer 301 and at least one inorganic layer 302, which are stacked on a cut surface(s) of an integrated display panel 200. For example, the side-reinforcing member 300 may be composed of multiple layers that include the organic layer 301 containing resin, and the inorganic layer 302 containing silica.

In accordance with an embodiment, the operation of forming the side-reinforcing member 300 illustrated in FIG. 15 may include the operation of forming at least one organic layer 301 and at least one inorganic layer 302 on cut surfaces of a display panel 210 and first and second auxiliary layers 220 and 230, wherein the organic layer 301 and the inorganic layer 302 may be sequentially formed on the cut surfaces.

Figure 16A:
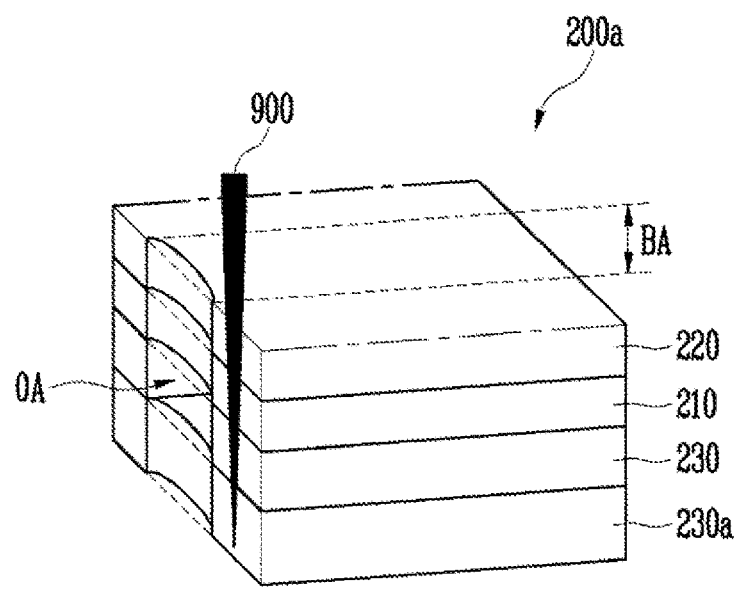
FIGS. 16A and 16B are diagrams illustrating a certain region of a display device according to an embodiment of the present disclosure.
Figure 16B:
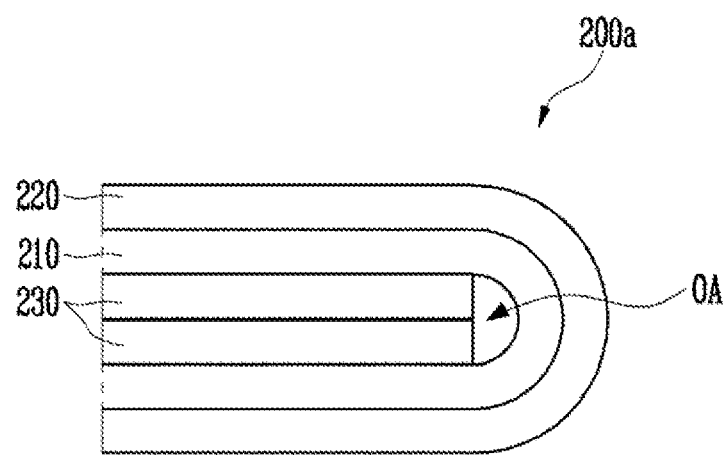

FIGS. 16A and 16B are diagrams illustrating a certain region of a display device according to an embodiment of the present disclosure. In the embodiments of FIGS. 16A and 16B, the same reference numerals are used to designate components similar to, or identical to, those in the above-described embodiments, and a detailed description of the components will be omitted. Although first and second auxiliary layers are each illustrated as being a single-layer structure in FIGS. 16A and 16B, at least one of the first and second auxiliary layers may be implemented as a multi-layer structure.

Referring to FIGS. 16A and 16B, the display device according to an embodiment of the present disclosure is provided with an integrated display panel 200a that includes a display panel 210, and a first auxiliary layer 220 and a second auxiliary layer 230 respectively provided on first and second surfaces of the display panel 210. In accordance with an embodiment, the integrated display panel 200a may include a bending area (BA) defined in a certain region of the display panel 210. In accordance with an embodiment, the integrated display panel 200a may be inwardly folded (in-folding) or outwardly folded (out-folding) along a bending axis (e.g., a predetermined bending axis) defined in the bending area (BA). For example, the integrated display panel 200a may be outwardly folded in the bending area (BA), as illustrated in FIG. 16B. In accordance with an embodiment, the bending area (BA) may be arranged in a display area of the integrated display panel 200a, but is not limited thereto. For example, the bending area (BA) may also be arranged in a non-display area of the integrated display panel 200a. For example, the integrated display panel 200a may be outwardly folded in the non-display area so that a pad unit provided in the non-display area is arranged on a rear surface of the display panel 210.

In accordance with an embodiment, at least one of the first auxiliary layer 220 and the second auxiliary layer 230 may include an open area (OA) corresponding to the bending area (BA). That is, at least one of the first auxiliary layer 220 and the second auxiliary layer 230 may be partially eliminated from the bending area (BA).

For example, in order to secure uniform visibility, the first auxiliary layer 220 provided on an image display plane of the display panel 210, together with the display panel 210, may be continuously extended even to the bending area (BA), while the second auxiliary layer 230 provided on the non-display plane of the display panel 210 may be partially omitted or eliminated from the bending area (BA) to then have an open area (OA) corresponding to the bending area (BA). In accordance with an embodiment, the second auxiliary layer 230 may be processed together with the display panel 210 and the first auxiliary layer 220 in a state in which the second auxiliary layer 230 is supported by a carrier film 230a. The carrier film 230a may be eliminated or detached after the processing of the integrated display panel 200a (e.g., side processing using a laser or a knife 900).

In the integrated display panel 200a in the above-described embodiment, volume loss may occur due to a processing operation. In particular, in the bending area (BA) in which the second auxiliary layer 230 is partially eliminated, relatively large volume loss occurs compared to the remaining area, thus causing the bending area (BA) to be relatively inwardly depressed. For example, when the integrated display panel 200a is processed using a laser 900 having uniform energy along the side processing line of the integrated display panel 200a, relatively excessive energy is applied to the bending area (BA) (e.g., when compared to the internal structure of the integrated display panel 200a), and thus great volume loss may occur. Accordingly, the bending area (BA) may have lower side strength than other areas. Although it is illustrated in FIG. 16A that the volume loss of the bending area (BA) has occurred only on one side surface (e.g., on a left side surface) of the integrated display panel 200a that is currently being processed using the laser 900 or the like, relatively large volume loss may occur in the bending area (BA) when processing is performed even on the other side surface (e.g., on a right side surface). In accordance with an embodiment, both sides of the integrated display panel 200a may be processed either concurrently/simultaneously or sequentially.

Figure 17A:
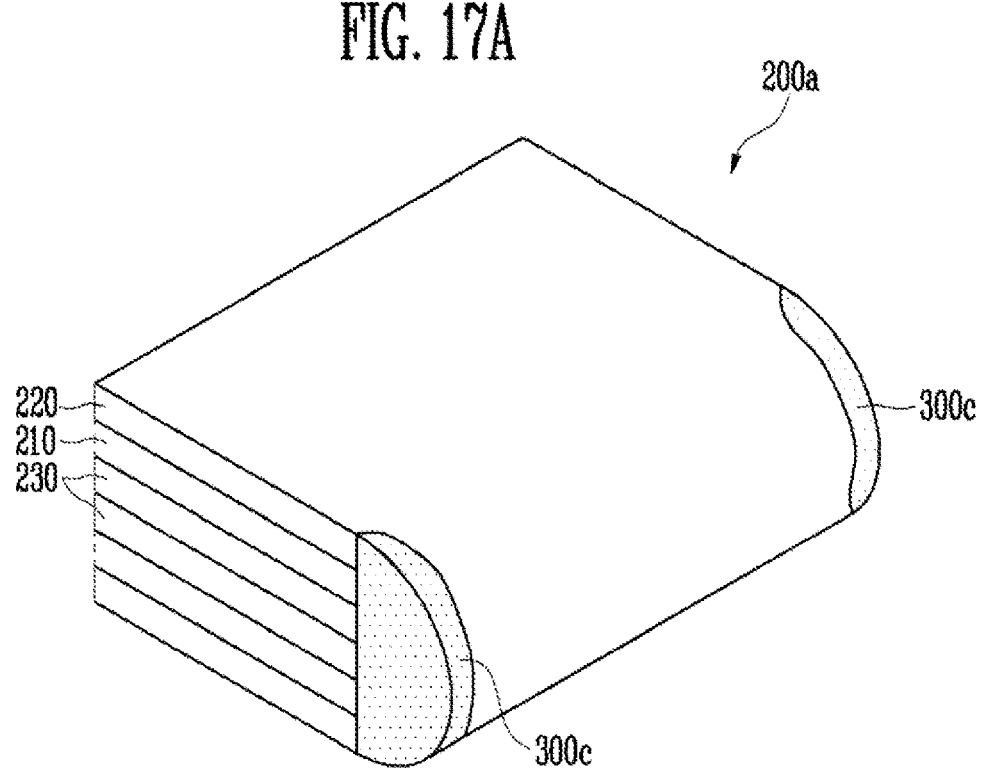
FIGS. 17A to 17C are diagrams illustrating a certain region of a display device according to an embodiment of the present disclosure.
Figure 17B:
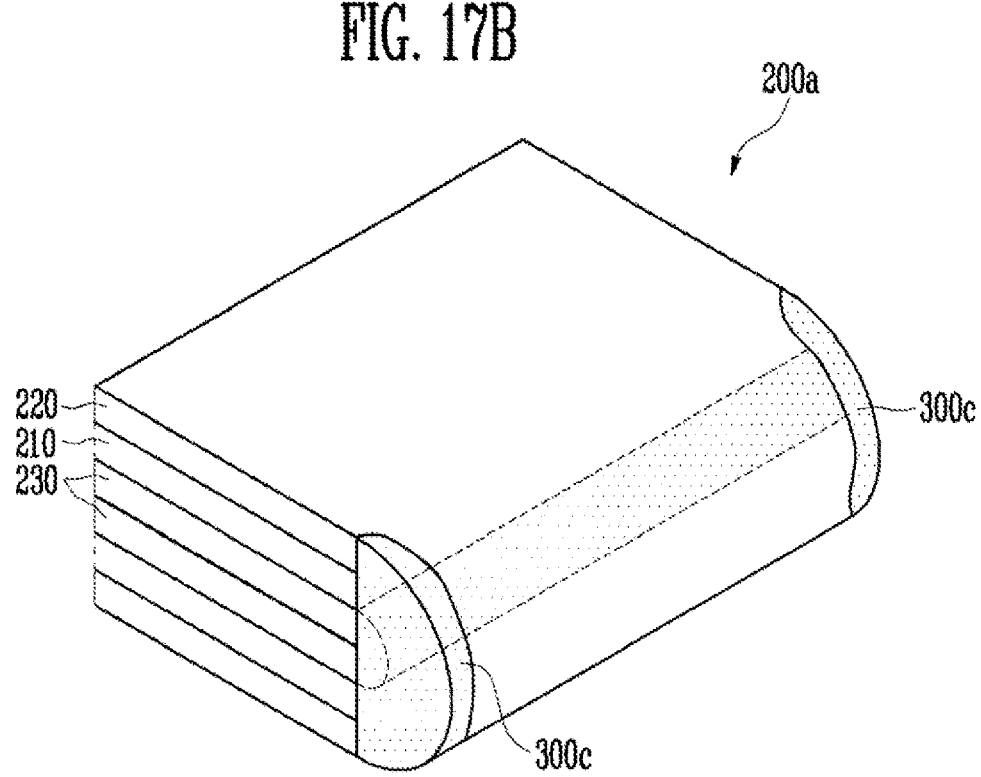
Figure 17C:
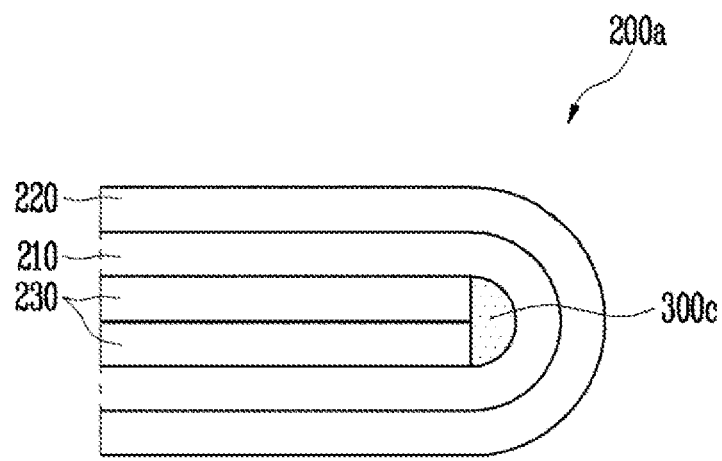

FIGS. 17A to 17C are diagrams illustrating a certain region of a display device according to an embodiment of the present disclosure. In an embodiment, FIG. 17C illustrates a section of the certain region of the display device illustrated in FIG. 17B. In the embodiments of FIGS. 17A to 17C, the same reference numerals are used to designate components similar to, or identical to, those in the embodiments of FIGS. 16A and 16B, and a repeated detailed description of the components will be omitted.

Referring to FIGS. 17A to 17C, the display device according to an embodiment is provided with the integrated display panel 200a, such as that illustrated in FIGS. 16A and 16B, and includes a side-reinforcing member 300c, which is provided on one or both sides of the open area (OA) illustrated in FIGS. 16A and 16B, and which fills at least a certain portion of the open area (OA). In accordance with an embodiment, the side-reinforcing member 300c may be provided on at least both sides of the bending area (BA), and may then compensate for volume loss. For example, the certain portion of the open area (OA) (e.g., both sides of the open area (OA)) may be filled with the side-reinforcing member 300c so that a region in which volume loss has occurred is mainly filled with the side-reinforcing member 300c, as illustrated in FIG. 17A or, alternatively, the open area (OA) may be completely filled with the side-reinforcing member 300c, as illustrated in FIGS. 17B and 17C.

The display device according to the embodiment of FIGS. 17A to 17C may also additionally include a side-reinforcing member 300 that encloses cut surfaces of a display panel 210, a first auxiliary layer 220, and a second auxiliary layer 230 along processing lines thereof, as in the above-described embodiments. In this case, the side-reinforcing member 300c illustrated in FIGS. 17A to 17C may be formed to be integrated with the side-reinforcing member 300, described above in the embodiments of FIGS. 5 to 15, or may be formed separately from the side-reinforcing member 300.

In accordance with the above-described embodiments, the side-reinforcing member 300c that is provided on at least both sides of the bending area (BA) to compensate for volume loss is formed, and thus the side strength of the bending area (BA) may be reinforced.

Figure 18A:
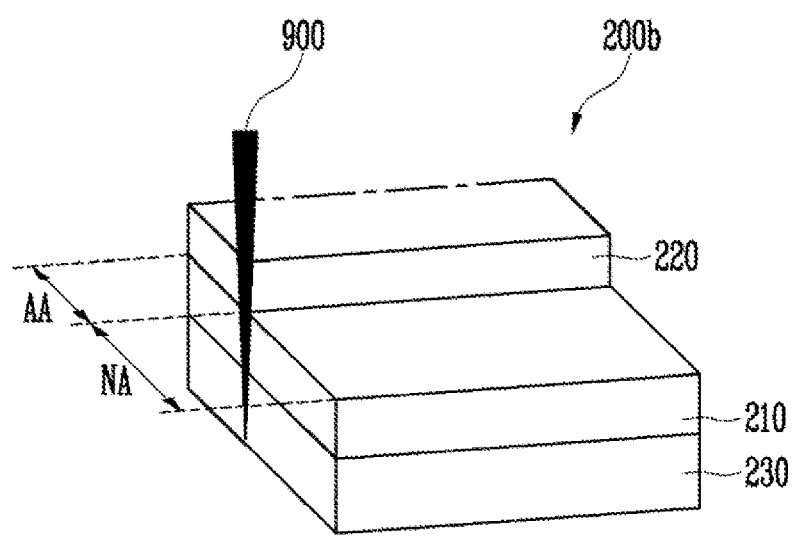
FIGS. 18A and 18B are diagrams illustrating a certain region of a display device according to an embodiment of the present disclosure.
Figure 18B:
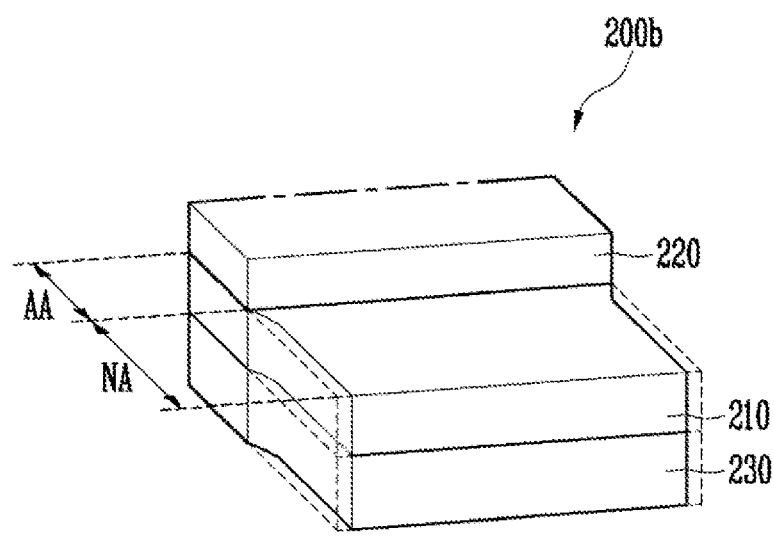

FIGS. 18A and 18B are diagrams illustrating a certain region of a display device according to an embodiment of the present disclosure. For example, in FIGS. 18A and 18B, a boundary between two areas included in the display device according to an embodiment of the present disclosure is chiefly illustrated. In the embodiments of FIGS. 18A and 18B, the same reference numerals are used to designate components similar to, or identical to, those in the above-described embodiments, and a repeated detailed description of the components will be omitted.

Referring to FIGS. 18A and 18B, the display device according to an embodiment of the present disclosure includes an integrated display panel 200b having different stacked structures in a first area (AA) and a second area (NA). In detail, the integrated display panel 200b may have the first area (AA) and the second area (NA), which are distinguished from each other. In accordance with an embodiment, the first area (AA) may include an active area in which an image is displayed, and the second area (NA) may include a non-active area around the active area, but the present disclosure is not limited thereto.

In accordance with an embodiment, at least one of a first auxiliary layer 220 and a second auxiliary layer 230 may be provided in only one of the first area (AA) and the second area (NA). For example, in order to come into contact with pads, the first auxiliary layer 220 may be provided only in the first area (AA) while being omitted from the second area (NA).

In the above-described display device, when the first auxiliary layer 220 and the second auxiliary layer 230 are simultaneously processed after the first auxiliary layer 220 and the second auxiliary layer 230 have been respectively provided on both surfaces of the display panel 210, a processing stepped shape may occur in the first area (AA) and in the second area (NA) (e.g., between the first area (AA) and the second area (NA)). For example, as illustrated in FIG. 18B, greater volume loss may occur in the second area (NA), in which the first auxiliary layer 220 is not arranged, when compared to the first area (AA), during a procedure for processing the integrated display panel 200b.

Figure 19:
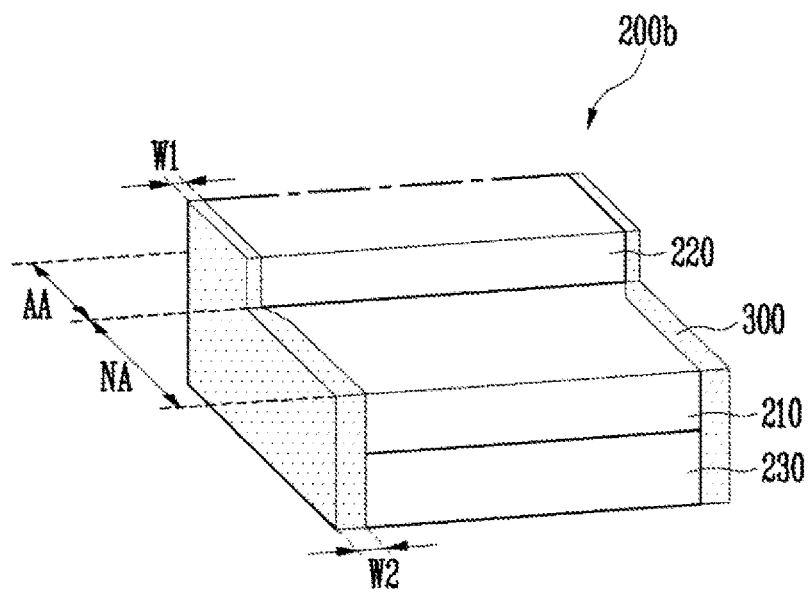
FIG. 19 is a diagram illustrating a certain region of a display device according to an embodiment of the present disclosure.

FIG. 19 is a diagram illustrating a certain region of a display device according to an embodiment of the present disclosure. In the embodiment of FIG. 19, the same reference numerals are used to designate components similar to, or identical to, those in the embodiments of FIGS. 18A and 18B, and a repeated detailed description of the components will be omitted.

Referring to FIG. 19, the display device according to an embodiment of the present disclosure includes the integrated display panel 200b, such as that illustrated in FIGS. 18A and 18B, and further includes a side-reinforcing member 300 that encloses cut surfaces of a display panel 210 and first and second auxiliary layers 220 and 230. In accordance with an embodiment, the side-reinforcing member 300 may have different widths in the first area (AA) and the second area (NA) so that volume loss in the second area (NA) may be compensated for. For example, the side-reinforcing member 300 may have a second width W2 in the second area (NA), which may be greater than a first width W1 in the first area (AA). Accordingly, the integrated display panel 200b may have overall substantially uniform widths in the first area (AA) and in the second area (NA).

In accordance with the above-described embodiment, the side strength of the integrated display panel 200b may be enhanced by effectively compensating for volume loss or the like that occurs in a procedure for processing the integrated display panel 200b.

In accordance with the above-described embodiments of the present disclosure, the integrated display panel 200, 200a, or 200b may be manufactured by directly forming, attaching, or providing the first auxiliary layer 220 and the second auxiliary layer 230 on the first surface and the second surface of the display panel 210, and thereafter simultaneously cutting and processing the display panel 210 and the first and second auxiliary layers 220 and 230. Accordingly, the thickness of the display device may be decreased, and mechanical strength of the display device may be improved.

Further, in accordance with the embodiments of the present disclosure, vulnerabilities that may occur due to processing limitations, such as volume loss and a taper, may be compensated for by forming the side-reinforcing member 300 or 300c on the cut surfaces of the display panel 210 and of the first and second auxiliary layers 220 and 230. Accordingly, the mechanical strength of the display device, especially, the side strength thereof, may be effectively improved.

In accordance with an embodiment of the present disclosure, the side-reinforcing member 300 or 300c may have, but is not limited to, a shape corresponding to a taper occurring on the cut surfaces of the display panel 210 and on the first and second auxiliary layers 220 and 230 so that the taper may be compensated for. That is, the shape, size, and/or thickness of the side-reinforcing member 300 or 300c may be changed in various forms.

Although, in the above embodiments, it is illustrated that the side-reinforcing member 300 or 300c is formed on the cut surface of the integrated display panel 200, 200a, or 200b immediately after the display panel 210 and the first and second auxiliary layers 220 and 230 have been processed, the formation location of the side-reinforcing member 300 and 300c and/or the formation operation thereof are not limited thereto. For example, after a separate film has been attached to at least one surface of the integrated display panel 200, 200a, or 200b or the display panel 210, the film may be processed by simultaneously cutting the film, together with the integrated display panel 200, 200a or 200b or the display panel 210, through an additional cutting process. Immediately after the film is processed, the side-reinforcing member 300 or 300c may also be formed on the cut surfaces of the film and the integrated display panel 200, 200a, or 200b or of the display panel 210.

That is, the side-reinforcing member 300 or 300c may be formed at any operation when it corresponds to an operation immediately after at least two components are simultaneously cut and processed during a module process for manufacturing the display device.

While the spirit and scope of the present disclosure is described by detailed exemplary embodiments, it should be noted that the above-described embodiments are merely descriptive and should not be considered limiting. Further, it should be understood by those skilled in the art that various changes, substitutions, and alternations may be made herein without departing from the scope of the disclosure as defined by the following claims.

The scope of the present disclosure is not limited by detailed descriptions of the present specification, and should be defined by the accompanying claims. Further, all changes or modifications of the present disclosure derived from the meanings and scope of the claims, and equivalents thereof should be construed as being included in the scope of the present disclosure.

What is claimed is:

1. A display device, comprising:
    a display panel comprising a first surface, and a second surface opposite the first surface;
    a first auxiliary layer on the first surface of the display panel, and comprising at least one layer;
    a second auxiliary layer on the second surface of the display panel, and comprising at least one layer; and
    a side-reinforcing member enclosing cut surfaces of the display panel, the first auxiliary layer, and the second auxiliary layer,
    wherein the side-reinforcing member on which curing and contraction have occurred encloses and clamps the cut surfaces on first sides of the display panel, the first auxiliary layer, and the second auxiliary layer.

2. The display device according to claim 1, wherein the side-reinforcing member has a thickness that gradually changes in accordance with the cut surfaces.

3. The display device according to claim 1, wherein the cut surfaces have an uneven portion, and
    wherein the side-reinforcing member fills a depression of the uneven portion.

4. The display device according to claim 1, wherein the side-reinforcing member comprises fine particles having hygroscopicity or water-repellent properties.

5. The display device according to claim 1, wherein the side-reinforcing member comprises at least one organic layer and at least one inorganic layer stacked on the cut surfaces.

6. The display device according to claim 1, further comprising a bending area at a region of the display panel,
    wherein at least one of the first auxiliary layer and the second auxiliary layer includes an open area corresponding to the bending area, and
    wherein the open area is formed by partially eliminating the at least one of the first auxiliary layer and the second auxiliary layer from the bending area.

7. The display device according to claim 6, wherein the side-reinforcing member is on both sides of the display panel, and fills at least a portion of the open area.

8. The display device according to claim 1, wherein the side-reinforcing member has a curved surface.

9. The display device according to claim 1, wherein the first auxiliary layer comprises at least one of a polarizing layer, a sensor layer, and a protective layer.

10. The display device according to claim 1, wherein the second auxiliary layer comprises at least one of a light-shielding layer, a reflective layer, a thermal conductive layer, and a protective layer.

11. The display device according to claim 1, wherein the side-reinforcing member comprises curable resin.

12. The display device according to claim 1, wherein the display panel comprises a first area and a second area,
    wherein at least one of the first auxiliary layer and the second auxiliary layer are in only one of the first area and the second area, and
    wherein the side-reinforcing member has different widths in the first area and the second area.

* * * * *